March 6, 1956 — R. J. KRIEGER — 2,737,644
POSITION INDICATOR FOR CONSUMABLE ELECTRODE
Filed Feb. 21, 1955 — 2 Sheets-Sheet 1
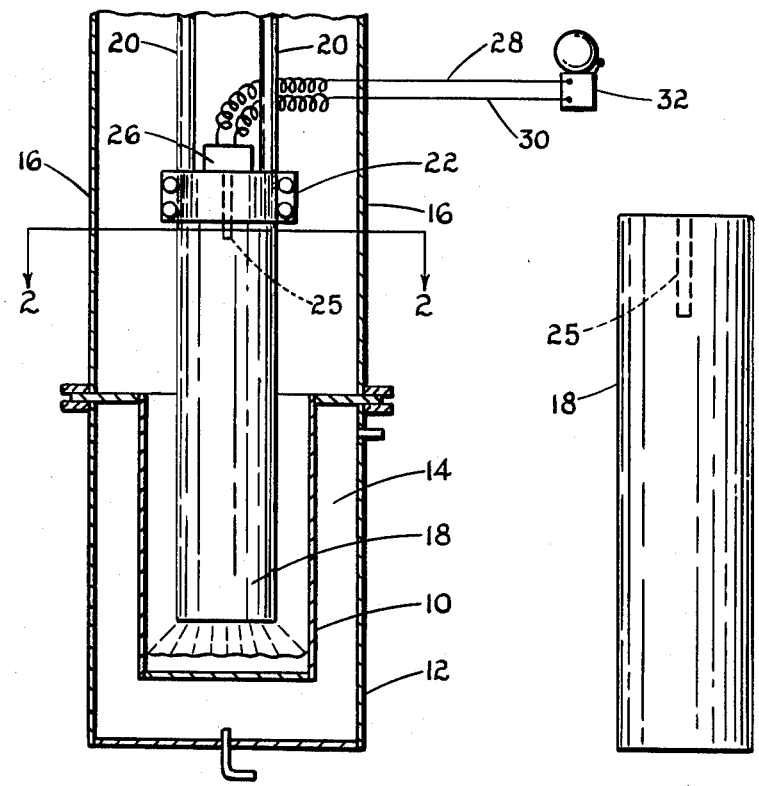
Fig. 1
Fig. 3
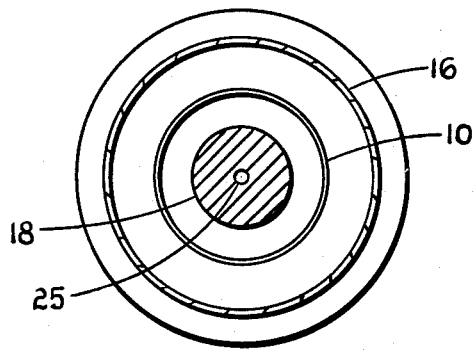
Fig. 2
INVENTOR.
Robert J. Krieger
BY
AGENT March 6, 1956  R. J. KRIEGER  2,737,644
POSITION INDICATOR FOR CONSUMABLE ELECTRODE
Filed Feb. 21, 1955  2 Sheets-Sheet 2

INVENTOR.
Robert J. Krieger
BY
AGENT

United States Patent Office 2,737,644
Patented Mar. 6, 1956

2,737,644

POSITION INDICATOR FOR CONSUMABLE ELECTRODE

Robert J. Krieger, Las Vegas, Nev., assignor to Titanium Metals Corporation of America, Pittsburgh, Pa., a corporation of Pennsylvania Application February 21, 1955, Serial No. 489,465

6 Claims. (Cl. 340—282)

This invention relates to consumable electrode arc melt-apparatus and more particularly to means for indicating the progress of the melting operation in the arc furnace as it reduces the length of the consumable electrode.

Consumable electrode arc melting furnaces are often employed to melt refractory metals such as titanium, zirconium and molybdenum. In such furnaces an elongated electrode is formed of the metal to be melted, often by compression of powdered metal into a cohesive stick. An arc maintained between the electrode of the metal being melted and metal in a subtended crucible gradually melts the electrode, the molten metal forming an ingot in the crucible. During the melting operation the electrode is gradually lowered into the crucible to maintain desired arc conditions, being clamped at the top and connected thereby to suitable mechanical lowering equipment. The electrode is generally melted or consumed as completely as possible; however the electrode should not be consumed or melted to a point too close to the clamps lest these and associated mechanical structures be also melted or at least affected by proximity to the heat of the arc. Therefore the length of the residual end or stub of the electrode is a critical factor affecting efficiency of the melting operation and life and maintenance of the equipment. Unfortunately the furnaces employed for arc melting are universally tightly enclosed so that the actual progress of the melting operation cannot be visually observed and mechanical devices for indicating remaining stub length have generally proved unreliable or inaccurate.

It is therefore the object of this invention to provide apparatus for indicating the length of a consumable electrode in an arc furnace. Another object of the invention is to provide apparatus to indicate when an electrode has been consumed to a predetermined point in an arc furnace. These and other objects of this invention will be apparent from the following description thereof and from the annexed drawings in which:

Figure 1 is a sectionalized illustration of the bottom portion of a consumable electrode arc furnace showing apparatus embodying features of this invention.

Figure 2 is a section of the furnace of Figure 1 taken along the lines 2—2.

Figure 3 illustrates the electrode with the bore hole in the top.

Figure 4:
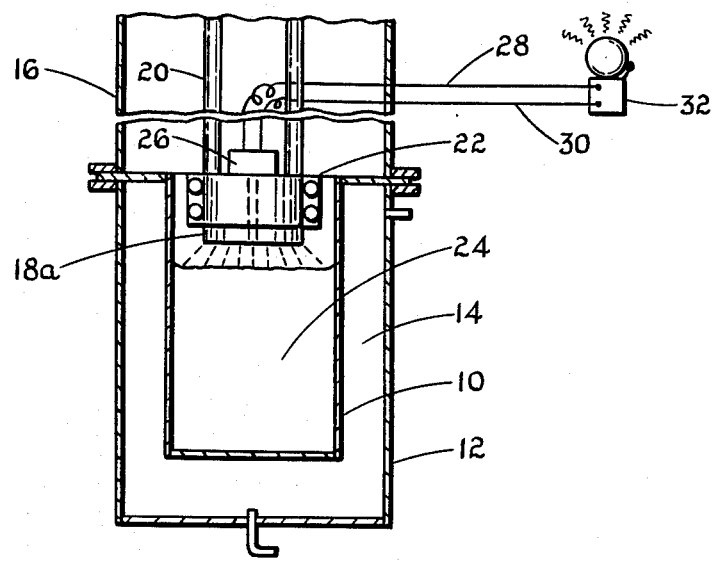
Figure 4 illustrates the apparatus of Figure 1 after the melting operation has consumed the electrode to the predetermined extent.

Referring particularly to Figures 1, 2 and 3 the apparatus of this invention is employed in a consumable electrode arc melting furnace of any suitable design and which may comprise a crucible 10 enclosed around its sides and bottom by a housing 12, the space between the housing and the crucible forming cooling water jacket 14. Disposed above the crucible housing 12 is a top housing with walls 16 which contains mechanism for lowering the electrode 18 into the crucible 10 at the desired rate. Such mechanisms are well known in the art and therefore are not shown in the drawings for simplicity and ease of understanding of this invention. They will ordinarily include an electrode carrier 20 actuated from above and to which is attached at its bottom by suitable clamps 22, or other equivalent means, electrode 18. As the melting proceeds under the influence of the heat of the arc, metal is transferred from the electrode, which is thereby consumed, into the crucible to form ingot 24 as more particularly shown in Figure 4. Melting is continued until only a short stub 18a of the original electrode 18 remains. Continued melting after this point is disadvantageous due to damage by the proximity to the heat of the arc to clamps 22, carrier 20 and other associated structures in this proximity.

To indicate, externally of the furnace, when a predetermined desirable length of stub 18a has been reached, the original electrode 18 is provided with a longitudinal bore hole 25 which is open at the top and extends into the electrode terminating interiorly thereof at the point at which it is desired to obtain an indication of the stub length. Above the electrode and in the line of sight of the bore hole is attached photo-cell 26. Current generated by the action of light on the photo-cell is carried through an exterior wall 16 of the furnace as by wires 28 and 30 to signal means 32 which will be actuated by such current. The signal means may comprise a bell or signal light or both, or other indicia. If desired or necessary, the current from the photo-cell may be employed to actuate relays or may be strengthened by suitable electrical amplification or other control in order to actuate the signal means and alternatively or additionally, if desired, may be arranged to cause shutting off of the furnace power and operation.

Figure 5:
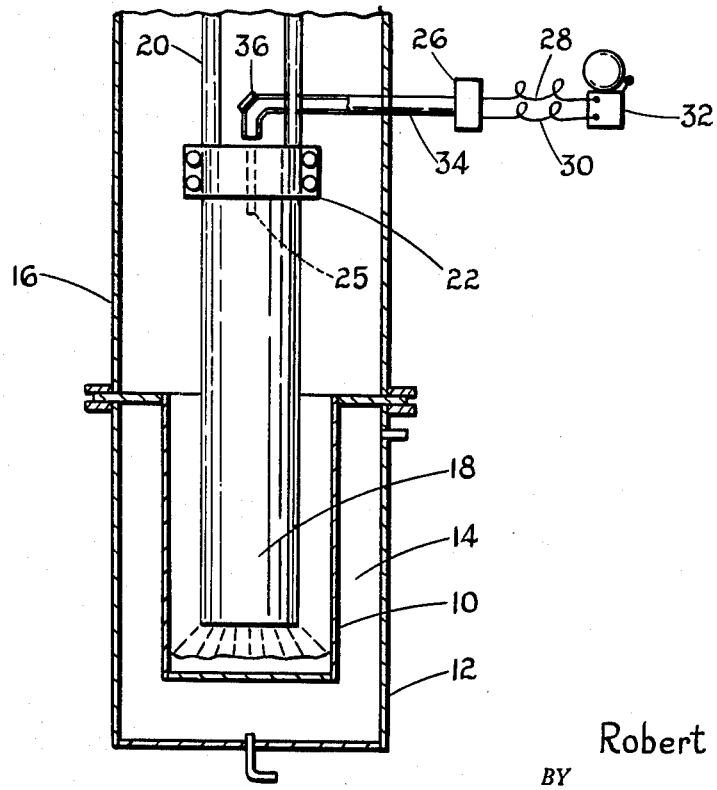
Figure 5 illustrates a modification of the apparatus shown in Figure 1.

In the modification illustrated in Figure 5 the line of sight of the bore hole 25 is deflected by optical means to enable the comparatively delicate photo-cell to be placed outside the furnace housing. This is accomplished by provision of sight tube 34 which passes through the housing wall 16 and which is provided at its inner end with a reflecting surface, such as a mirror 36, aligned with the bore hole and at such an angle to reflect light received therefrom axially through the tube 34. Photo-cell 26 is then placed at the outer end of tube 34 and connections made to the relays and/or amplifiers, if employed, and the signal device.

In operation, the electrode is first drilled downwardly from the top with a convenient diameter bore hole 25 which is of a length corresponding to the length of stub remaining at the point the signal indication is desired. It will be appreciated that the bore hole may not necessarily be centrally located with respect to the ingot top surface but may be placed for convenience to avoid interference with the photo-cell or line of sight by other mechanism or construction in the furnace. Then the electrode is placed in position and clamped to its carrier, the furnace evacuated or placed under inert atmosphere as the case may be and melting accomplished in conventional manner. When the melting has progressed to the point that the electrode has been consumed to the previously closed bottom end of the bore hole, this hole will now be open and the intense light of the arc will shine through the now open bore hole and affect the photo-cell which will produce current to actuate directly, or indirectly, through relays or amplifiers, the signal means.

I claim:

1. In arc melting apparatus in which an electrode is consumed, the combination of a furnace, an electrode in said furnace having a longitudinal bore hole extending from the top into said electrode and terminating at a point interiorly thereof, light responsive means in the line of sight of the bore hole in said electrode; and signal means connected to and actuated by said light responsive means, whereby consumption of said electrode to the point of termination of the bore hole therein will admit light from the arc through the bore hole to the light responsive means which will actuate the signal means.

2. In arc melting apparatus in which an electrode is consumed, the combination of a furnace, an electrode in said furnace having a longitudinal bore hole extending from the top into said electrode and terminating at a point interiorly thereof, a photo-cell in the line of sight of the bore hole in said electrode, and signal means exterior of said furnace connected to and actuated by said photo-cell, whereby consumption of said electrode to the point of termination of the bore hole therein will admit light from the arc through the bore hole to the photo-cell which will actuate the signal means.

3. In arc melting apparatus in which an electrode is consumed, the combination of a furnace, an electrode in said furnace having a longitudinal bore hole extending from the top into said electrode and terminating at a point interiorly thereof, a sight tube transfixing a wall of said furnace, a mirror at the interior end of said sight tube disposed to receive light from the bore hole in said electrode and to reflect the light axially of said sight tube, a photo-cell at the exterior end of said sight tube, and signal means connected to and actuated by said photo-cell, whereby consumption of said electrode to the point of termination of the bore hole therein will admit light from the arc through the bore hole and said sight tube to the photo-cell which will actuate the signal means.

4. In arc melting apparatus in which a metal electrode is consumed, the combination of a furnace, a longitudinally extending metal electrode disposed for movement to facilitate the melting of the metal from one end thereof, the electrode having a bore hole therein extending inwardly from the other end and terminating at a predetermined point interiorly thereof whereby light from the arc is admitted to the bore hole when the electrode is consumed to the interior termination of the hole, light responsive means disposed to be energized by arc light in the bore hole of the electrode, and means connected in circuit relation with the light responsive means and responsive to the energization thereof by the arc light in the bore hole disposed to be operated as an indication of the consumption of the electrode to the interior termination of the bore hole thereof.

5. In arc melting apparatus in which an electrode is consumed, the combination of a furnace, a metal electrode disposed for vertical movement in the furnace to facilitate the melting of metal from one end thereof, the electrode having a bore hole therein extending inwardly from the other end and terminating at a predetermined point interiorly thereof whereby light from the arc is admitted to the bore hole when the electrode is consumed to the interior termination of the bore hole, light responsive means disposed exteriorly of the furnace, a sight tube having an end terminating adjacent the light responsive means and extending into the furnace with the other end thereof terminating adjacent the bore hole of the electrode to receive the arc light therefrom and effect an energization of the light responsive means, and means connected in circuit relation with the light responsive means and responsive to the energization thereof by the arc light disposed to be operated as an indication of the consumption of the electrode to the interior termination of the bore hole thereof.

6. In arc melting apparatus in which a metal electrode is consumed, the combination of an evacuated furnace, a longitudinally extending metal electrode disposed for movement within the evacuated furnace to facilitate the melting of the metal from one end thereof, the electrode having a bore hole therein extending inwardly from the other end and terminating at a predetermined point interiorly thereof whereby light from the arc is admitted to the bore hole when the electrode is consumed to the interior termination of the bore hole, light responsive means disposed exteriorly of the evacuated furnace, a sight tube having one end terminating interiorly of the evacuated furnace adjacent the bore hole of the electrode to receive the arc light therefrom and another end terminating exteriorly of the evacuated furnace adjacent the light responsive means whereby the light responsive means is energized by the arc light in the bore hole, and means connected in circuit relation with the light responsive means and responsive to the energization thereof by the arc light disposed to be operated as an indication of the consumption of the electrode within the evacuated furnace to the interior termination of the bore hole thereof.

References Cited in the file of this patent

UNITED STATES PATENTS

| | | |
|---|---|---|
| 2,428,635 | Pearson | Oct. 7, 1947 |
| 2,487,024 | Mathison | Nov. 1, 1949 |